United States Patent [19]

Nakashima et al.

[11] Patent Number: 4,915,187

[45] Date of Patent: Apr. 10, 1990

[54] MOTORCYCLE ARMREST MOUNTING ACOUSTICAL UNIT

[75] Inventors: Tai Nakashima, Tokyo; Hideaki Nebu, Saitama, both of Japan

[73] Assignee: Honda Giken Kogyo Kabushiki Kaisha, Tokyo, Japan

[21] Appl. No.: 113,454

[22] Filed: Oct. 28, 1987

[30] Foreign Application Priority Data

Oct. 29, 1986 [JP] Japan .................... 61-165079[U]

[51] Int. Cl.⁴ .............................................. B62D 61/02
[52] U.S. Cl. .................................... 180/219; 297/411
[58] Field of Search ............... 180/219, 218, 89.1;
280/289 R, 289 A; 296/37.1, 37.13, 37.8, 78.1,
153; 297/411, 412, 243, 217, 194, DIG. 9;
224/32 A, 32 R

[56] References Cited

U.S. PATENT DOCUMENTS 4,549,629 10/1985 Komuro ............................... 180/219
4,600,208 7/1986 Morishima ........................ 224/32 A
4,690,237 9/1987 Funabashi ........................... 180/219

FOREIGN PATENT DOCUMENTS 3037186 4/1982 Fed. Rep. of Germany ...... 296/153

Primary Examiner—Charles A. Marmor
Assistant Examiner—Richard Camby
Attorney, Agent, or Firm—Lyon & Lyon

[57] ABSTRACT

A motorcycle organization is described in which audio speaker equipment is conveniently housed in armrests associated with the vehicle rear seat, which armrests are integrally formed on the closure cover of a trunk disposed rearwardly of the rear seat.

7 Claims, 4 Drawing Sheets

MOTORCYCLE ARMREST MOUNTING ACOUSTICAL UNIT

BACKGROUND OF THE INVENTION

The present invention relates to motorcycles and, more particularly, to means for mounting audio equipment therein.

In a motorcycle equipped with an acoustical unit such as a radio, a pair of speakers are mounted substantially at both end portions inside the fairing which encloses the front and both side portions of the body of the motorcycle. Under this arrangement, in the case where two persons ride on the motorcycle, the position of the person on the rear seat is further from the speakers than that of the rider (driver) on the front seat. Accordingly, because of this fact and since the sound from the speakers is somewhat blocked by the driver, it is difficult for the person on the rear seat to hear it.

Therefore, it is desirable to provide speakers also in the rear portion so that the rider on the rear seat can easily hear the speaker-generated sound to about the same extent as the rider on the front seat. However, since the aforementioned fairing is not provided at the rear portion of the motorcycle body, there arises a problem concerning where the rear speakers are to be mounted.

It is to the amelioration of this problem, therefore, to which the present invention is directed.

SUMMARY OF THE INVENTION

According to one aspect of the present invention, in order to solve the above problem, in a motorcycle having a front seat and a rear seat, armrests are provided on both the right and left sides of the rear seat and a speaker is disposed in the interior of each such armrest. Such construction of the present invention is advantageous in that the speakers can be disposed effectively in positions close to the rider in the rear seat and without being exposed to the exterior by utilization of the armrests provided on both sides of the rear seat.

According to another aspect of the invention, there is provided an armrest configuration for a motorcycle provided with a front seat and a rear seat and which is adapted to mount a trunk rearwardly of said rear seat, characterized in that a body portion of the trunk and a closure cover covering the body portion from above are interconnected so as to be capable of opening and closing through the intermediary of a hinge arrangement which extends along a front surface of the trunk and which has an upper end fixed to the closure cover and a lower end pivotally mounted on the body portion. A base plate surface of a box-like armrest is fixed to abut an outer surface of the hinge arrangement and an audio unit, such as a radio speaker, is arranged inside the armest.

According to the present invention, since the base plate surface of the armrest abuts the plate surface of the hinge arrangement and they are firmly fixed to each other, sufficient rigidity for the armrest is provided, particularly for the mounting of the armrest to the trunk.

For a better understanding of the invention, its operating advantages and the specific objectives obtained by its use, reference should be made to the accompanying drawings and description which relate to a preferred embodiment thereof.

DESCRIPTION OF THE PREFERRED EMBODIMENTS

Figure 1:
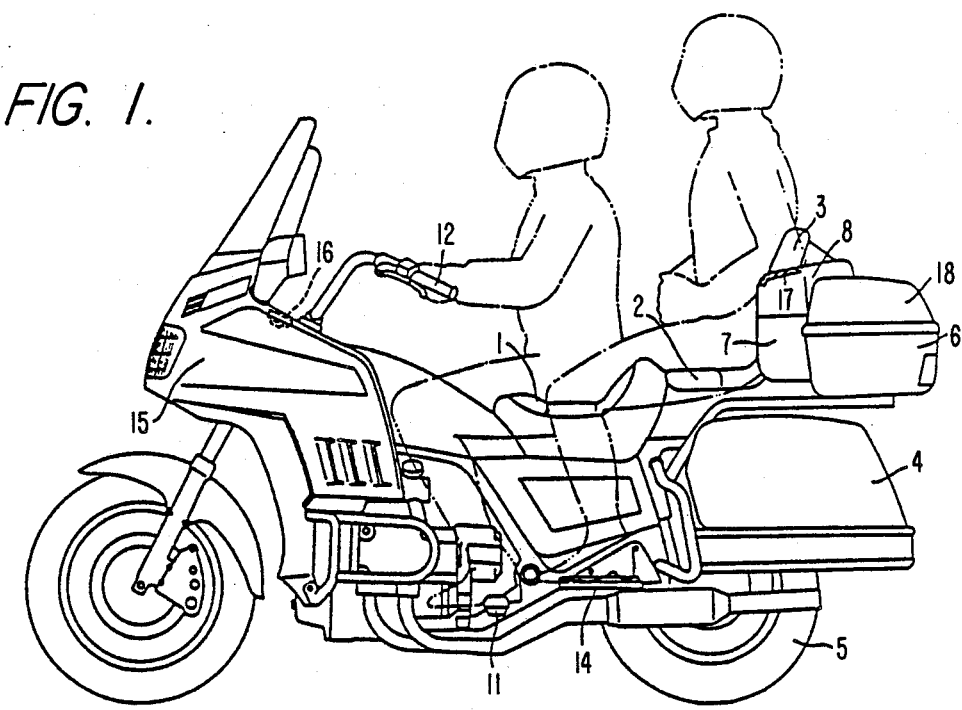
FIG. 1 is a side view of a motorcycle organization incorporating one embodiment of the present invention.
Figure 2:
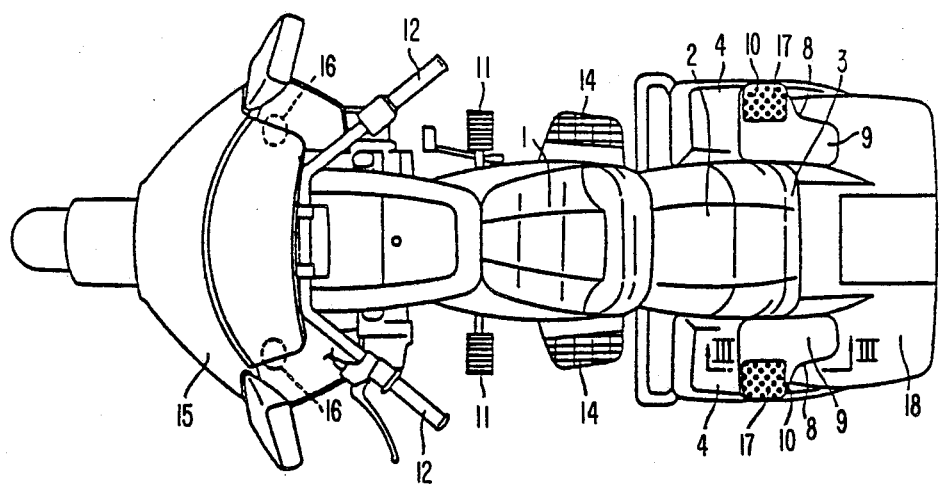
FIG. 2 is a plan view of the motorcycle of FIG. 1.

FIG. 1 is a side view of a motorcycle to which is applied the present invention and FIG. 2 is a top view thereof. This motorcycle is provided with a front seat 1 and a rear seat 2. A backrest 3 is provided at the rear portion thereof. Further, side trunks 4 are provided on both sides of the motorcycle body in positions below the rear seat 2 and they are attached to the body frame so that they partially cover the side portions of the rear wheel 5. Behind the rear seat 2 is provided a container case, or trunk, 6 extending rearwardly from the backrest 3, and being secured to the body frame. Pockets 7 are formed in positions adjacent to the front ends of both side portions of the trunk 6, with an armrest 8 being mounted above the upper surface of each pocket 7.

As shown, the driver sits astride the front seat 1 and manipulates a handle bar 12 while putting his feet on steps 11. Likewise, a fellow rider sits on the rear seat 2 and puts his feet on footrests 14 while resting his back against the backrest 3, and his elbows on the armrests 8. Thus, the rider on the rear seat 2 can maintain a comfortable posture. The front portion of the motorcycle frame is surrounded by a fairing 15 extending oppositely from the front to both sides. As in a conventional motorcycle equipped with an acoustical system, front speakers 16 are attached to both side portions of the inner surface of the fairing 15.

In the described arrangement, however, there are further provided rear speakers in addition to the front speakers 16, the rear speakers 26 being disposed within the armrests 8. As shown in FIG. 2, the armrests 8 each comprise an armrest body 9 extending from the upper surface of each pocket 7 to the front portion of the upper surface of the closure cover 18 of the trunk 6 and a speaker-containing portion 10 projecting sideways. The interior of the speaker-containing portion 10 is hollow and the rear speakers 26 are each received in this hollow portion, although only a speaker grille 17 formed in the upper surface of each speaker-containing portion 10 is shown in FIGS. 1 and 2.

Figure 3:
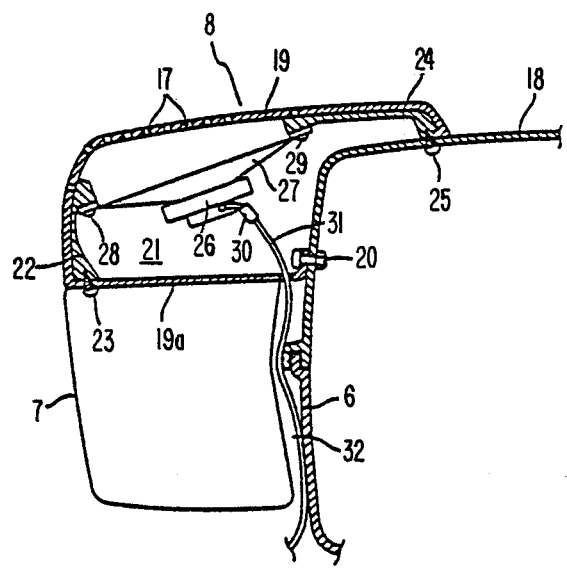
FIG. 3 is an enlarged sectional view taken along line III—III of FIG. 2.

As shown in FIG. 3, which is a longitudinal section of the rear speaker mounting portion, a shell member 19 of each armrest 8 is fixed by means of bolts 20 to the closure cover 18 of the trunk 6 and a bottom plate portion 19a of the shell member 19 extends along the upper surface of the pocket 7. Thus, the armrest 8 is fixed to the closure cover 18 and adapted to open vertically together therewith. And, as illustrated in the figure, a hollow speaker chamber 21 is formed by the shell member 19 and the closure cover 18 in the speaker-containing portion 10. The speaker grille 17 is formed in the upper portion of the shell member 19 and a stay member 22 is disposed along the shell member 19 at a lower front portion of the speaker chamber 21, the stay member 22 being fixed by bolt 23 to the bottom plate portion 19a of the shell member 19. Also, at an upper rear portion of the speaker chamber 21 is provided a stay member 24 along the shell member 19, the stay member 24 being fixed to the closure cover 18 by the bolt 25.

The speaker 26 is fixed at the peripheral edge portion of its cone 27 to end portions of the stays 22 and 24 by bolts 28 and 29, respectively, and in this state it is held in place within the speaker chamber 21. The speaker cone 27, thus, faces toward the head of the rear seat rider through the speaker grille 17.

The speaker 26 is connected to a harness 31 through a coupler 30. The harness 31 is drawn out from the speaker chamber 21 through the bottom plate portion 19a of the shell member 19, then passes through a gap 32 formed between the container case 6 and each pocket 7 and, thereafter, is connected to an acoustical unit (not shown) which is disposed in the motorcycle body in a predetermined position. The speaker 26 of such construction is disposed in each of the armrests 8, provided on both right and left sides, as can be seen from FIG. 2.

As set forth above, since in this embodiment there are provided speakers also at the rear portion of the motorcycle, the rider on the rear seat can also readily hear the speaker-generated sound. Additionally, the speakers 26 are arranged to be mounted without being exposed to the exterior by utilization of the armrests 8, so, not only is the entire appearance of the motorcycle not impaired, but also the speakers are protected from external elements.

Figure 4:
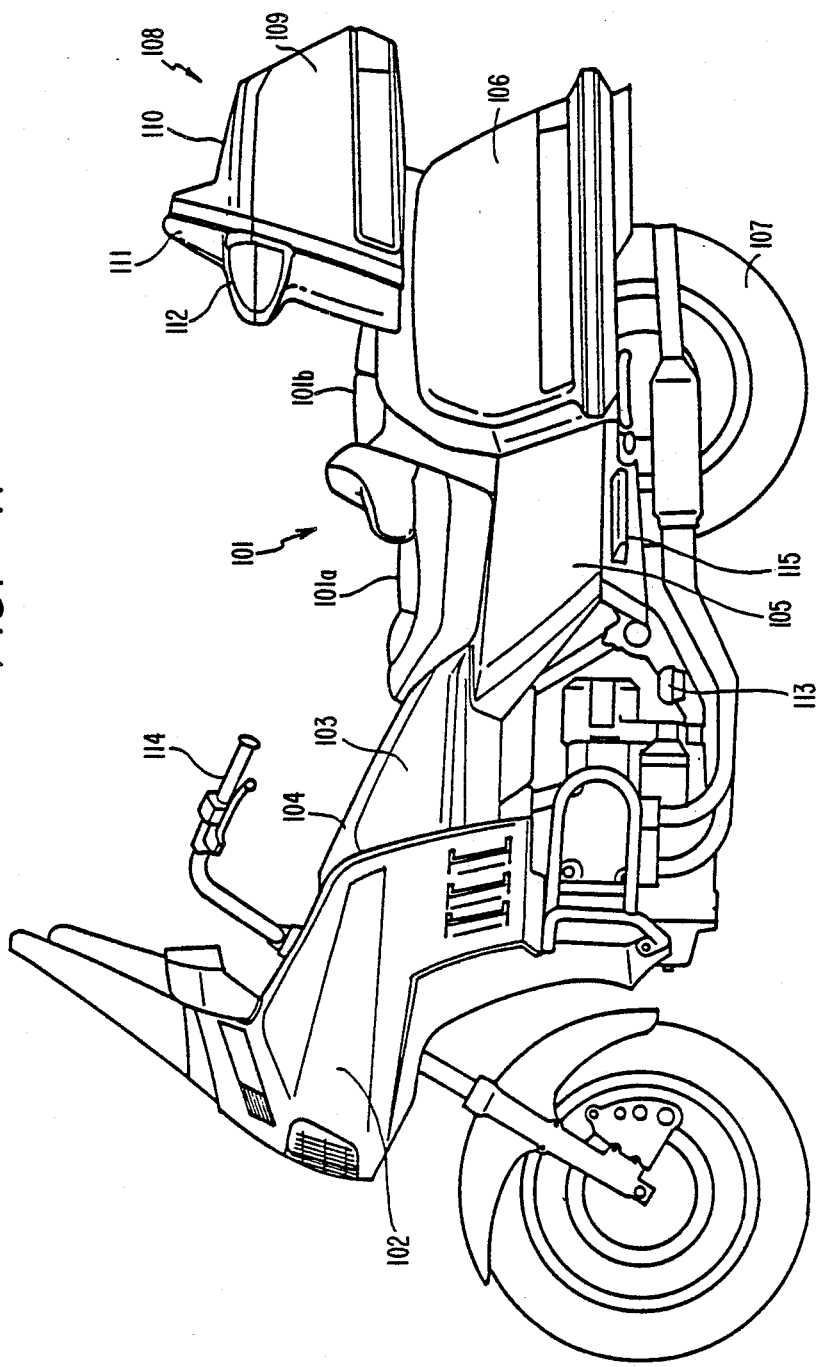
FIG. 4 is a side view of a motorcycle organization incorporating another embodiment of the present invention.
Figure 5:
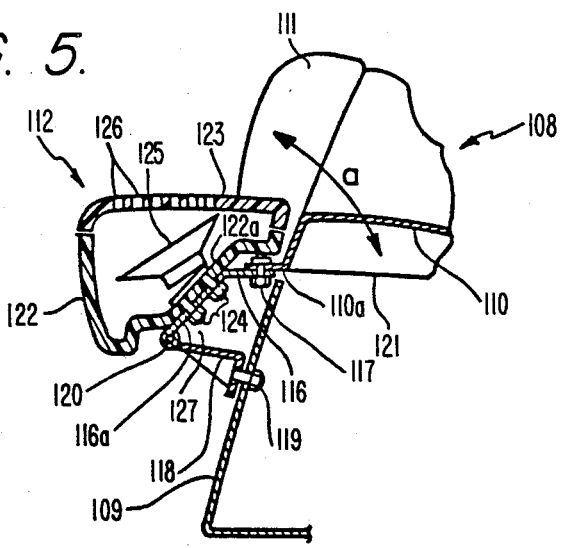
FIG. 5 is an enlarged sectional view taken along line V—V of FIG. 6.
Figure 6:
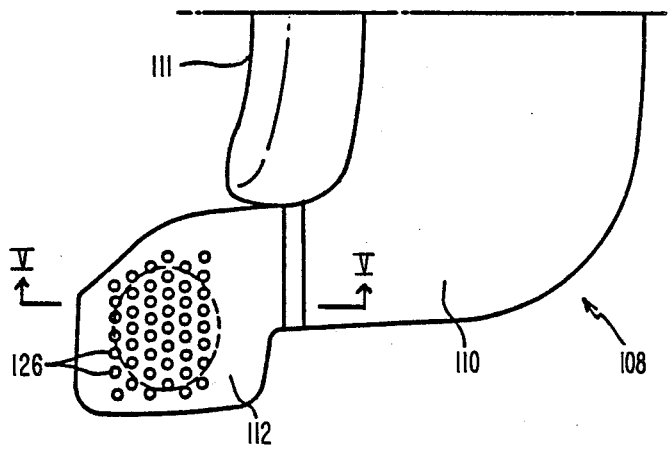
FIG. 6 is a partial plan view of the motorcycle organization of FIG. 4.

FIGS. 4 to 6 illustrate another embodiment of the invention. The motorcycle 101 illustrated in FIGS. 4 to 6 is provided with a two seater seat arrangement consisting of a front seat 101a and a rear seat 101b. The front portion of the vehicle body is covered with a fairing 102 from the front surface extending oppositely over both sides. Portions of the vehicle body between the fairing 102 and the front seat 101a are covered with a side enclosure 103 at both side surfaces, and with a top enclosure 104 at an upper surface. To the rear lower portion of the side enclosure 103 is connected the front upper portion of a side cover 105. Both lower sides of the front seat 101a are covered with the side cover 105. A saddle bag 106 is connected to the side cover 105 at each lower side of the rear seat 101b at the rear end of the side cover 105. The saddle bag 106 is arranged to project laterally from both left and right sides of the rear wheel 7. On an upper portion of the saddle bags 106 is attached a trunk 108. Thus, the illustrated motorcycle has its entire vehicle body upper portion covered by a surface structure that presents an elegant outline.

The trunk 108 consists of a trunk body 109 and a trunk closure cover 110 which is mounted on the trunk body portion 109 in such a way as to be capable of being pivoted up and down through the intermediary of a hinge arrangement provided on a front portion of the trunk closure cover 110. At the front portion of the trunk closure cover 110 is formed in the center portion thereof a backrest 111 for an occupant who sits on the rear seat 101b. An armrest 112 is provided to project forwardly at each of the left and right sides of the closure cover 110. The driver sits on the front seat 101a straddling the vehicle body and operates a handle bar 114 while resting his feet on footrests 113. Similarly, a fellow passenger sits on the rear seat 101b and rests his feet on footrests 115 while maintaining a comfortable position by resting his back against the backrest 111 and his arms on the armrests 112.

At both sides of the lower end portion of the front surface of the trunk closure cover 110 is formed respectively a flange 110a that projects forwardly. The front edge portion of a plate-like, or a frame-like hinge stay 116, is fixed to the flange portion 110 by means of a threaded screw 117. After extending forwardly along the flange portion 110, the hinge stay 116 forms a slanting surface 116a by bending toward an inclined lower portion. On the one hand, on the front surface of the trunk body portion 109 is fixed by a threaded screw 119 a bracket 118 which projects forwardly from the lower portion of the flange portion 110a. The lower portion of the inclined surface portion 116a of the hinge stay 116 is pivotally mounted on the front end portion of the bracket 118 by means of a pivot pin 120. Accordingly, the trunk closure cover 110 pivots up and down about the pivot pin 120, as shown by the arrow "a" and opens and closes an upwardly facing opening 121 in the trunk body portion 109.

Each armrest 112 is formed of a resin material having an appropriate hardness and texture and consists of a lower supporting hollow body 122 and an armrest plate 123 supported on and fixed to the lower supporting body 122. The armrest 112 is fixed to the trunk closure cover 110 through the intermediary of the hinge 116 by fastening the plate-like base plate portion 122a of the supporting body 122 thereto by means of threaded screws 124.

A speaker 125 is received inside each armrest 112 enclosed by the supporting body 122 and the armrest plate 123. The supporting body 122 serves as a housing for the speakers 125 and the armrest plate 123 forms a speaker grille therefor. Accordingly, in the armrest plate 123 contains a plurality of speaker grille bores 126. Further, as shown in FIG. 6, an outside portion of the armrest 112 projects from the side of the trunk closure cover 110 to expand the space on which to position the elbow. Thus, the speaker 125 received in the armrest 112 is near the passenger sitting on the rear seat 101b. The sound generated from the speakers 125 is readily heard by the fellow passenger as well as by the driver on the front seat 101a.

A cord (not shown) connected to the speaker 125 penetrates the base plate portion 122a of the supporting body 122 and the inclined surface portion 116a of the hinge stay 116 so as to be drawn out from a space 127 surrounded by the hinge stay 116 and the bracket 118. The cord, thereafter, extends forwardly along the vehicle body for connection to an appropriate acoustical unit (not shown).

Since the armrest 112 is arranged as described above with the base plate portion 122a extending along the outer surface of the inclined surface portion 116a of the hinge stay 116 and, further, since they are fixed together by the threaded screws 124, the armrest 112 is thus rigidly mounted on the trunk closure cover 110 through the intermediary of the hinge stay 116 and is adapted to ensure sufficient rigidity for an armrest. Moreover, since the mounting position of the armrest 112 is in close proximity to the pivot pin 120, which is the rotating center of the trunk closure cover 110, the armrest 112 is not displaced to a significantly great extent when opening and closing the trunk closure cover 110. Accordingly, it is unnecessary to have an excessively great length of speaker cord which is wired along the trunk body portion 109 after being drawn out from the armrest 112 and, therefore, the cord wiring is simple.

It should be further understood that, although a preferred embodiment of the invention has been illustrated and described herein, changes and modifications can be made in the described arrangement without departing from the scope of the appended claims.

We claim:

1. A motorcycle comprising:
   a frame;
   a front seat, a rear seat and a trunk disposed in longitudinally spaced relation on said frame;
   said trunk including a hollow body portion having an opening and a removable closure cover closing said opening;
   armrests attached to said closure cover on opposite sides thereof and in laterally opposed relation with respect to said seat, said armrests each including shell means defining a hollow compartment having an arm-supporting portion thereover;
   a perforate grille formed in said arm-supporting portion of said shell means; and
   audio equipment disposed in said armrest compartment including speaker apparatus fixedly disposed in facing relation with respect to said perforate grille.

2. The motorcycle according to claim 1 including means forming a stay underlying said grille portion; and said speaker apparatus being secured to said stay.

3. The motorcycle according to claim 1 wherein said trunk includes cooperating flange means on said body portion and said closure cover for vertical separation therebetween.

4. The motorcycle according to claim 1 wherein said trunk includes hinge means connected between said body portion and said closure cover for pivoted separation therebetween.

5. The motorcycle according to claim 4 wherein said hinge means includes a pivot axis disposed laterally of said frame and forwardly of said body portion whereby said closure cover and said armrests pivot upwardly toward the forward end of said frame.

6. The motorcycle according to claim 5 wherein said hinge means includes a stationary hinge bracket secured to said trunk body portion, a movable hinge portion pivotally connected to said hinge bracket; and means on said movable hinge portion for mounting said armrest body.

7. The motorcycle according to claim 5 wherein said motorcycle includes a backrest intermediate said rear seat and said trunk and said hinge means includes a pair of stationary hinge brackets laterally spaced from opposite sides of said backrest; a movable hinge portion pivotally connected to each of said hinge brackets and means on said movable hinge portion for mounting said armrest body.

* * * * *